(12) United States Patent
Katz et al.

(10) Patent No.: US 11,756,555 B2
(45) Date of Patent: Sep. 12, 2023

(54) BIOMETRIC AUTHENTICATION THROUGH VOICE PRINT CATEGORIZATION USING ARTIFICIAL INTELLIGENCE

(71) Applicant: NICE LTD., Ra'anana (IL)

(72) Inventors: Natan Katz, Tel Aviv (IL); Tal Haguel, Petach Tikva (IL)

(73) Assignee: NICE LTD., Ra'anana (IL)

( * ) Notice: Subject to any disclaimer, the term of this patent is extended or adjusted under 35 U.S.C. 154(b) by 149 days.

(21) Appl. No.: 17/313,040

(22) Filed: May 6, 2021

(65) Prior Publication Data

US 2022/0358933 A1 Nov. 10, 2022

(51) Int. Cl.
| | |
|---|---|
| *G10L 17/06* | (2013.01) |
| *G10L 17/04* | (2013.01) |
| *G06N 3/04* | (2023.01) |
| *G10L 19/00* | (2013.01) |
| *G10L 17/18* | (2013.01) |

(52) U.S. Cl.
CPC ............ *G10L 17/06* (2013.01); *G06N 3/04* (2013.01); *G10L 17/04* (2013.01); *G10L 17/18* (2013.01); *G10L 19/00* (2013.01)

(58) Field of Classification Search
CPC ......... G10L 17/06; G10L 17/04; G10L 17/18; G10L 19/00; G06N 3/04
See application file for complete search history.

(56) References Cited

U.S. PATENT DOCUMENTS

| | | | | |
|---|---|---|---|---|
| 10,490,195 | B1 * | 11/2019 | Krishnamoorthy | G10L 17/22 |
| 2001/0056349 | A1 * | 12/2001 | St. John | G07C 9/37 |
| | | | | 704/270 |
| 2017/0053108 | A1 * | 2/2017 | Jakobsson | G06F 21/32 |
| 2018/0082689 | A1 * | 3/2018 | Khoury | G10L 17/00 |
| 2019/0354787 | A1 * | 11/2019 | Fong | G06V 10/454 |
| 2021/0012766 | A1 * | 1/2021 | Kim | G10L 25/51 |
| 2021/0183374 | A1 * | 6/2021 | Thomson | G10L 15/30 |
| 2021/0193151 | A1 * | 6/2021 | Song | G10L 17/06 |
| 2021/0193174 | A1 * | 6/2021 | Enzinger | G10L 17/00 |
| 2021/0233541 | A1 * | 7/2021 | Chen | G10L 17/08 |
| 2021/0390959 | A1 * | 12/2021 | Jain | A61B 5/7267 |
| 2022/0093101 | A1 * | 3/2022 | Krishnan | G10L 15/20 |

FOREIGN PATENT DOCUMENTS

CN 111199729 A * 5/2020 ............ G10L 15/08

* cited by examiner

*Primary Examiner* — Richemond Dorvil
*Assistant Examiner* — Nadira Sultana
(74) *Attorney, Agent, or Firm* — Haynes and Boone, LLP

(57) ABSTRACT

A system is provided to categorize voice prints during a voice authentication. The system includes a processor and a computer readable medium operably coupled thereto, to perform voice authentication operations which include receiving an enrollment of a user in the biometric authentication system, requesting a first voice print comprising a sample of a voice of the user, receiving the first voice print of the user during the enrollment, accessing a plurality of categorizations of the voice prints for the voice authentication, wherein each of the plurality of categorizations comprises a portion of the voice prints based on a plurality of similarity scores of distinct voice prints in the portion to a plurality of other voice prints, determining, using a hidden layer of a neural network, one of the plurality of categorizations for the first voice print, and encoding the first voice print with the one of the plurality of categorizations.

20 Claims, 6 Drawing Sheets

BIOMETRIC AUTHENTICATION THROUGH VOICE PRINT CATEGORIZATION USING ARTIFICIAL INTELLIGENCE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to biometric authentication and artificial intelligence (AI) models, and more specifically to a system and method for improved biometric authentication through voice print analysis using voice print categorizations from machine learning (ML) or neural network (NN) layers.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

When customers interact with different computing systems of a service provider, such as sales or purchasing systems, customer relationship management (CRM) systems, service or help systems, information systems, and the like, the customers may require authentication. These customers may correspond to individual users and/or users of an organization that may want to authenticate their identity in order to gain access to certain services and/or data, for example, computing service the users have enrolled in and/or purchased, data the user has stored or generated, and/or previous activity the user has performed with the service provider's systems. Biometric authentication may provide more trusted authentication by performing authentication that should be particular to a specific user and difficult to imitate. During voice communications, such as communications over a publicly switched telephone network (PSTN), cellular network, voice over IP (VoIP), voice over LTE (VoLTE), and/or voice communications over data networks, biometric authentication may be done using voice samples and voice prints. When initially enrolling a user in voice authentication, a recording of a voice sample, such as a response to a phrase, name, identifier, or the like, may be stored in a database system of the service provider that assists in voice authentication.

The generation of the voice print and storing for a long period of time requires a high storage capacity, which may then cause a few seconds or more of latency during the later authentication flow. Compression of varying degrees may be used with voice prints to expedite retrieval and authentication; however, compression of data may lead to data loss, which may affect clarity and quality of an initial voice print used for later authentication and increase the risk of an inaccurate determination of authenticity. Further, certain voices may be better at self-identifying and/or imitating other voice prints. Users that are good at self-identifying by the voice print therefore encounter slow authentication times, while users good at imitating other voice prints may fraudulently authenticate themselves as other users during voice authentication. This leads to significant time losses and risk for systems and users. It therefore is desirable to retain the benefits of data compression by building a compression mechanism for the voice prints that improves storage capacity and latency times for authentication while minimizing fraud and risk.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION OF PREFERRED EMBODIMENTS

Figure 1:
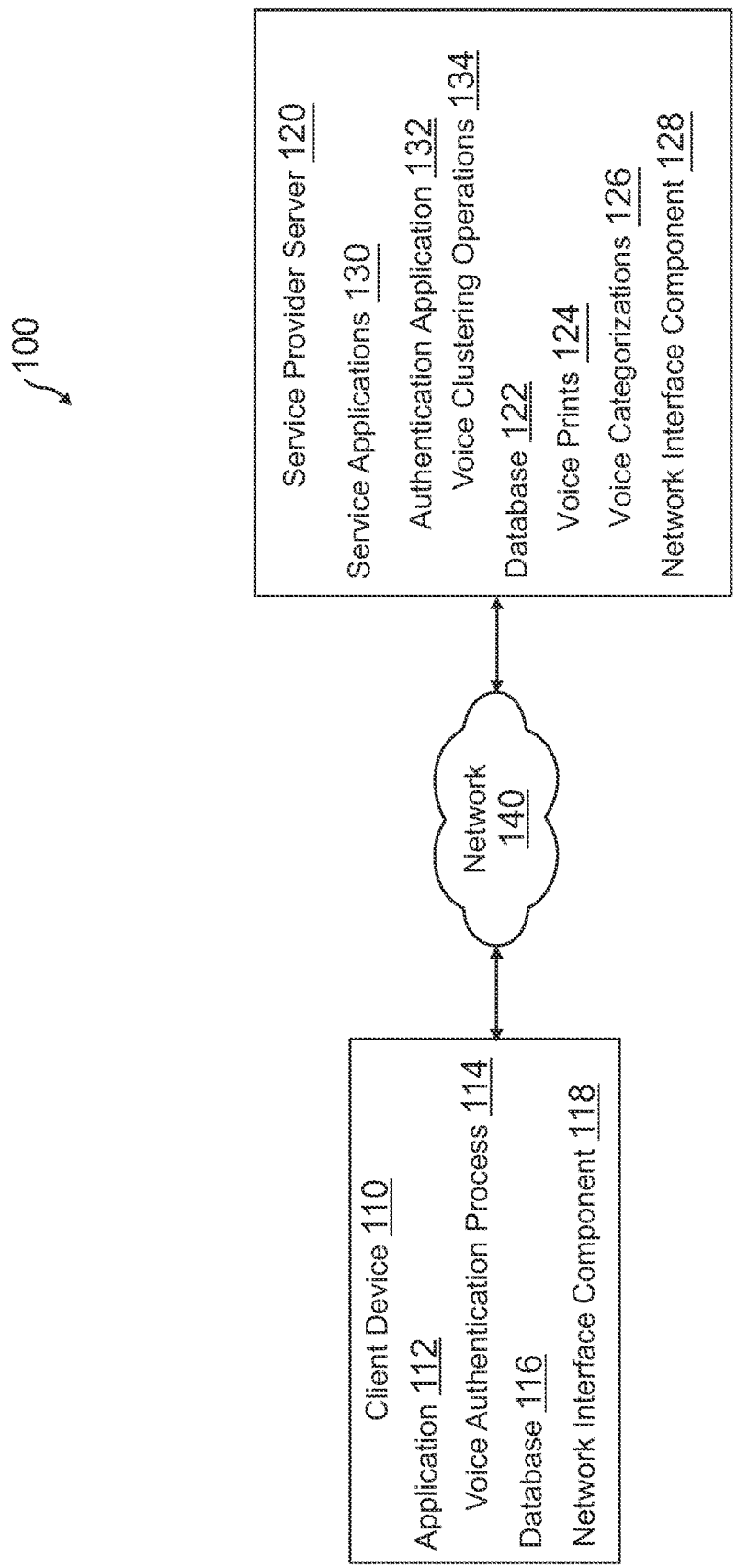
FIG. 1 is a simplified block diagram of a networked environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

An artificial intelligence (AI) system trained for biometric authentication through voice prints, methods, data structures, and systems is provided to train and utilize an AI model to classify voice prints into categorizations of a "menagerie" or other collection of categories. A service provider, such as a sale and purchasing system, help or assistance system, CRM system, customer service system, business management system, organizational management system, or other networked service provider, may provide audio and/or audiovisual communications. This may include phone calls, video conferencing, audio/video streaming and communication services, and the like. For example, different internal and/or external users of a service provider may interact over end-to-end voice communications. During voice communications, a biometric authentication system may provide biometric authentication through analysis of voice prints, such as a stored voice print compared to a voice print provided during voice authentication. However, in conventional systems, the voice print is stored for long time periods in high capacity storage. Thus, there may be significantly time delays where a media file for a voice print is large, uncompressed, and/or stored in high capacity storage systems that various embodiments of the disclosure herein may advantageously overcome.

In order to compress voice prints, or use more efficient compression processes, the biometric authentication system herein may utilize an AI model and system, such as a NN or Deep NN (DNN), to initially classify voice prints during enrollment for voice authentication. Initially, a service provider, or other biometric authentication system that utilizes voice authentication, may train an AI system having one or more AI models, such as ML, NN, or DNN models, for classification of voice prints. The training data may initially correspond to voice prints, which are clustered and/or categorized based on their similarity scores to neighboring and other voice print scores, as well as groupings by scores. The training data may include how well the voice prints self-identify their users and/or imitate or are similar to one or more other voice prints. Thus, the training data may be annotated or unannotated. The AI model may be trained using a deep learning algorithm or technique to determine the individual layers and output classifications.

The AI model may be used for classifications. Since an ML, NN, or DNN model may normally output a similarity score, ranking, and/or classification, instead of utilizing an output layer for classification, a hidden layer, such as a hidden layer one or two layers away from the output layer, may instead be utilized for categorizations. For example, by abstracting the decision-making of the AI model to a layer away from the output layer, a better categorization of different voice prints into the menagerie or collection of categories may be accomplished. The collection of categories or menagerie may categorize voice prints into certain categories based on how well they self-identify and/or the likelihood of confusion or impersonation of another voice print. For example, a menagerie may include categories labeled as "sheep," "goats," "lambs," and "wolves." Sheep voice prints may have a low false rejection rate (FRR) and therefore self-identify well, which makes those voice prints hard to imitate and copy and thus result in a low rate of impostors. Goat voice prints have a high FRR and high rejection rate even with their own voice print, so also may be hard to copy as a very specific voice print is needed. However, lamb voice prints are easy to impersonate and have high rates of imposters, while wolf voice prints easily impersonate others' voice prints including both lambs' voice prints and other wolves' voice prints.

Once the categorizations and AI model are determined, the AI model may be deployed with a biometric authentication system to categorize voice prints during enrollment of the voice prints in voice authentication. The biometric authentication system may then receive an enrollment request from a user for voice authentication. The user may provide a voice sample as a voice print of the user and an identification information for the user. The identification information may correspond to a phone number, an identifier (ID) of the user (e.g., a globally unique identifier (GUID), universally unique identifier (UUID), or generally any ID that may uniquely identify the user to the system), a name, a device ID, or the like, which may be later provided during voice authentication attempts. The voice print of the user may then be processed using the AI system and AI model(s) to categorize the voice print into a category. In some embodiments, the AI system may utilize a menagerie of voice prints, where voice prints are categorized as the aforementioned sheep, goats, lambs, and/or wolves categories. The categorization may be based on the voice prints' likelihood of falling into these categorizations and therefore how well the voice print self-identifies, a likelihood of FRR, and/or how well the voice print impersonates other voice prints. Once categorized, the voice print may be encoded with an identifier or value for the corresponding categorization and may be compressed and stored. This compression of the voice print encoded with the categorization identifier allows for reduction in storage requirements and faster access and retrieval when later needed.

Thereafter, the user (or a malicious user) may attempt voice authentication with the biometric authentication system. The ID for the user is received with a voice print and the compressed and/or encoded voice print is retrieved for comparison. The comparison may result in a score, value, or analysis using a biometric comparison and/or AI system. This score may be based on a calculated distance between scores for the voice prints, such as a similarity score between the voice prints. The biometric authentication system may implement a threshold to the score that is required to be met or exceeded for authenticating the user. However, the threshold may be adjusted depending on the encoded categorization of the voice print. Where the voice print falls into a categorization that is difficult to impersonate, such as categorizations for sheep and/or goats, the threshold may be lowered. However, the threshold may be heightened for categorizations as wolves, and in particular, lambs, which may be the most vulnerable to impersonation. Using the dynamic threshold, the user may then be authenticated, retested, and/or refused authentication based on the provided voice print.

The embodiments described herein provide methods, computer program products, and computer database systems for algorithmic voice print categorization. The service provider system associated with or incorporating the voice print categorization AI system may therefore categorize, encode, and compress voice prints during enrollment, thereby reducing preparation and processing times during later authentication. For example, the online system may provide a biometric authentication AI system that provide voice authentication with lower storage requirements and reduced latency, thereby resulting in faster voice authentication with reduced voice print storage. Once a voice print categorization AI model is established, the biometric authentication AI system may provide voice authentication in a faster and more convenient manner.

According to some embodiments, in a service provider computing system accessible by a plurality of separate and distinct organizations, a voice authentication AI model is provided for identifying, predicting, and designating particular voice prints into distinct categorizations, thereby optimizing voice authentication, reducing data processing cost and storage resources, and providing faster voice authentication with better accuracy during authentication.

Example Environment

The system and methods of the present disclosure can include, incorporate, or operate in conjunction with or in the environment of a biometric authentication service, system, database, and portal, which may include web and device applications used for voice authentication. FIG. 1 is a block diagram of a networked environment suitable for implementing the processes described herein according to an embodiment. As shown, an environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, cloud-based architectures have been developed to improve collaboration, integration, and community-based cooperation between users without sacrificing data security. One or more devices and/or servers may be operated and/or maintained by the same or different entities.

FIG. 1 illustrates a block diagram of an example environment 100 according to some embodiments. Environment 100 may include client device 110 and a service provider server 120 that interact to provide automated categorization of voice prints during enrollment, which may be encoded, compressed, and later used in voice authentication. In other embodiments, environment 100 may not have all of the components listed and/or may have other elements instead of, or in addition to, those listed above. In some embodiments, the environment 100 is an environment in which categorization of voice prints is provided. A client device 110 may be any machine or system that is used by a user to perform voice authentication. Client device 110 can be a handheld computing device, a mobile phone, a laptop computer, a notepad computer, a work station, and/or a network of computing devices. As illustrated in FIG. 1, client device 110 might interact via a network 140 with service provider server 120, which performs the voice authentication.

Client device 110 may be utilized in order to access computing services, resources, and/or data via application 112. Client device 110 may be utilized by a customer, client, or another user that interacts with service provider server 120 and requires authentication. A user's unique ID may be provided during a login or authentication process on client device 110, which may require a voice print for voice authentication. The user may initially perform an enrollment with a biometric authentication system of service provider server 120 for voice authentication. Thereafter and once authenticated through voice prints and voice authentication, the user may then access computing resources provided by service provider server 120. The user may perform voice authentication through voice authentication process 114 of application 112. Thus, client device 110 may correspond to a device, server, or the like that interfaces with service provider server 120 to utilize the services, applications, data storage, and the like of the corresponding computing environment once authenticated through voice authentication process 114. Service provider server 120 may receive the unique ID for the customer and provide access to computing resources via service applications 130. Thereafter, application 112 residing locally on client device 110 may display and utilize service applications 130 provided by service provider server 120.

Service provider server 120 may be utilized by different customers, clients, organizations, companies, and/or other users to access and utilize computing resources, which may be provided through voice authentication. Service provider server 120 may provide computing services via service applications 130 and may utilize authentication application 132 to provide voice authentication through enrollment and voice print comparison services. Service applications 130 may include applications utilized by users, which provide services, data processing, storage, and the like to user via client device 110, such as those involved in sale and purchasing, help or assistance, CRM, business management, organizational management, and the like. Authentication application 132 may include voice clustering operations 134 to cluster and/or categorize voice prints according to their likelihood of self-identification and/or impersonation. Service applications 130 may also include other applications associated with user interface display, data processing or output, data retrieval and/or storage, user interface display and output, server security, and other additional applications for cloud and/or on-premises computing architectures.

Service provider server 120 may provide services for voice authentication through authentication application 132. For example, voice authentication process 114 may be provided to client device 110 when initially enrolling a user in a biometric authentication process and system provided via authentication application 132. Authentication application 132 may utilize voice clustering operations 134 during enrollment to obtain a voice sample of a user using client device 110 and generate a voice print of the user for future authentication by categorizing the voice print. The categorizations by voice clustering operations 134 may correspond to a menagerie or other collection of categories that provide additional information about the voice print, such as if the voice print has a relatively high or low FRR, is good at self-identification or difficult to impersonate, is easily impersonated, and/or easily impersonates other voice prints, as described herein. Thus, by using a categorization of the voice prints (e.g., into four animal categories of a menagerie described herein, although other categorizations with fewer or more categories may be used in alternative embodiments), information theory may be used to provide an assumption of the voice print for compression of voice prints and faster voice authentication.

Voice authentication process 114 of application 112 on client device 110 may then be used when logging in to an account or other authentication system for access and use of computing services provided through service application 130. Authentication application 132 may then access voice prints 124 and voice categorizations 126 from database 122 to perform authentication of the user using client device 110. Voice prints 124 may correspond to stored and compressed voice prints for voice authentication, which may be encoded with a categorization identifier for voice categorizations 126. Authentication application 132 may dynamically adjust a threshold similarity score and/or require a particular similarity score or other measurement of similarity between a provided voice print and a corresponding one of voice prints 124. Thereafter, authentication application 132 may provide an authentication result to client device 110 via application 112, which may approve or decline authentication, or require another voice print or sample of the user via voice authentication process 114.

In some embodiments, the users of client device 110 may differ in their respective capacities, and the capacity of a particular client device 110 might be determined by applications, permissions, and profiles for the current user. Thus, different users will have different capabilities and perform different authentication events with regard to accessing and authenticating via application 112. However, this is not mandatory, and it is understood that client device 110 may generally have certain capacities that are universal to users, entities, or other clients (thereby not specific to operations submitted for processing by service provider server 120).

Client device 110 may execute a web-based client that accesses a web-based application for service provider server 120, or may utilize a rich client, such as a dedicated resident application, to access service provider server 120. Client device 110 may utilize one or more application programming interfaces (APIs) to access and interface with service provider server 120 in order to request enrollment in voice authentication and later authentication through voice prints 124 encoded with voice categorizations 126. Thus, application 112 can be used to access data and applications hosted by service provider server 120 and to perform searches on stored data, for example, through providing a user interface to a user (e.g., a GUI output) or via an API of application 112. Interfacing with service provider server 120 may be provided through application 112 and may include data stored to database 116, such as a device fingerprint, device ID, or other ID that may be provided during a login and authentication event via voice authentication process 114. Service provider server 120 may process and provide data through service applications 130, such as voice print categorizations using trained AI models for voice clustering operations 134. Database 122 of service provider server 120 may store data associated with voice prints 124 and voice categorizations 126, such as encoded and/or compressed voice prints using the trained AI models, IDs associated with voice prints 124, and file metadata/metadata tables for data lookup.

Client device 110 might communicate with service provider server 120 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between client device 110 and service provider server 120 may occur over network 140 using a network interface component 118 of client device 110 and a network interface component 128 of service provider server 120. In an example where HTTP/HTTPS is used, client device 110 might include an HTTP/HTTPS client commonly referred to as a "browser" for sending and receiving HTTP//HTTPS messages to and from an HTTP//HTTPS server, such as service provider server 120 via network interface component 118. Similarly, service provider server 120 may host an online platform accessible over network 140 that communicates information to and receives information from client device 110 via network interface component 128. Such an HTTP/HTTPS server might be implemented as the sole network interface between client device 110 and service provider server 120, but other techniques might be used as well or instead. In some implementations, the interface between client device 110 and service provider server 120 includes load sharing functionality. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

Client device 110 may utilize network 140 to communicate with service provider server 120, which is any network or combination of networks of devices that communicate with one another. For example, the network can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, service provider server 120 is configured to provide webpages, forms, applications, data, and media content to client device 110 and/or to receive data from client device 110. In some embodiments, service provider server 120 may be provided or implemented in a server environment and/or cloud environment, which may be accessible through one or more APIs with or without a corresponding graphical user interface (GUI) output. Service provider server 120 further provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Several elements in the system shown in FIG. 1 include embodiments that are explained briefly here. For example, client device 110 could include a desktop personal computer, workstation, laptop, notepad computer, PDA, cell phone, or any wireless access protocol (WAP) enabled device or any other computing device capable of interfacing directly or indirectly to the Internet or other network connection. Client device 110 may also be a server or other online processing entity that provides functionalities and processing to other client devices or programs, such as online processing entities that provide services to a plurality of disparate clients.

Client device 110 typically runs an HTTP/HTTPS client, e.g., a browsing program, such as Microsoft Internet Explorer® or Edge® browser, Google Chrome® browser, Mozilla Firefox® browser, or a WAP-enabled browser in the case of a cell phone, notepad computer, PDA or other wireless device, or the like. According to one embodiment, client device 110 and all of its components are configurable using applications, such as a browser, including computer code run using a central processing unit such as an Intel Pentium® processor or the like. However, client device 110 may instead correspond to a server configured to communicate with one or more client programs or devices, similar to a server corresponding to service provider server 120 that provides one or more APIs for interaction with client device 110.

Thus, client device 110 and/or service provider server 120 and all of their components might be operator configurable using application(s) including computer code to run using a central processing unit, which may include an Intel Pentium® processor or the like, and/or multiple processor units. A server for client device 110 and/or service provider server 120 may correspond to Window®, Linux®, and the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine-readable storage medium (media) having instructions stored thereon/in which can be used to program a computer to perform any of the processes of the embodiments described herein utilizing one or more computing devices or servers.

Computer code for operating and configuring client device 110 and/or service provider server 120 to intercommunicate and to process webpages, applications and other data and media content as described herein are preferably downloaded and stored on a hard disk, but the entire program code, or portions thereof, may also be stored in any other volatile or non-volatile memory medium or device corresponding to database 116 and/or database 122, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun MicroSystems, Inc.).

Artificial Intelligence Model for Voice Print Categorization

Figure 2A:
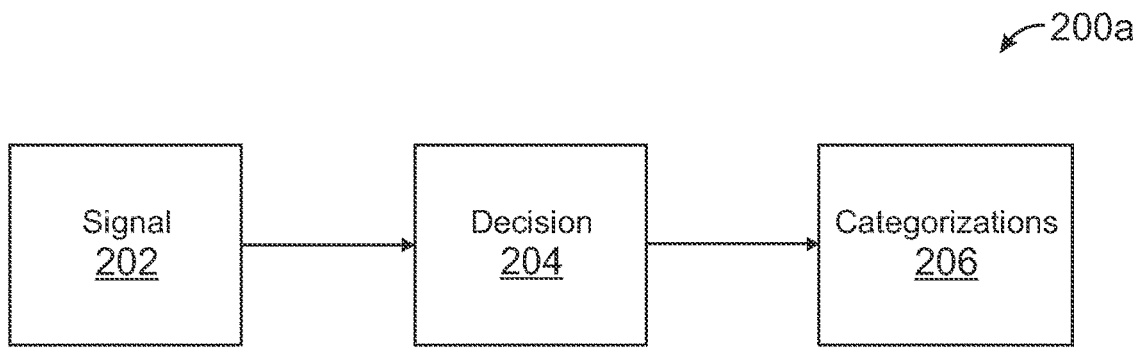
FIG. 2A is a simplified diagram of an exemplary process for training an AI model for categorizing voice prints into a menagerie for a biometric authentication system according to some embodiments.

FIG. 2A is a simplified diagram of an exemplary process for training an AI model for categorizing voice prints into a menagerie for a biometric authentication system according to some embodiments. Diagram 200a of FIG. 2A includes operations performed during training of an AI model for voice print categorization, such as when training AI models used by voice clustering operations 134 of authentication application 132 discussed in reference to environment 100 of FIG. 1. In this regard, diagram 200a displays a signal 202 for training data that may be used to when training a menagerie or other collection of categories in order to categorize voice prints and encode with their categorization.

Figure 2B:
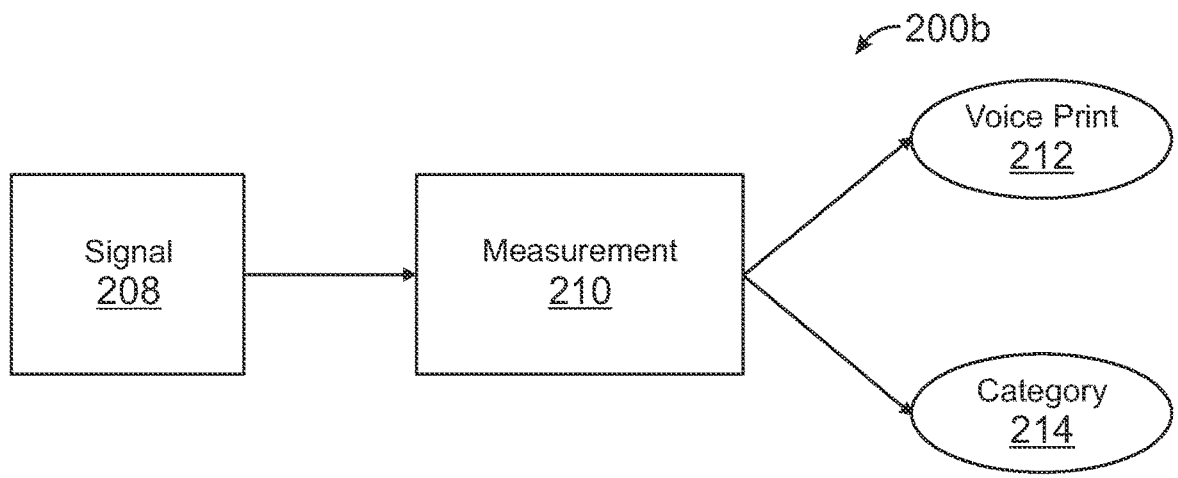
FIG. 2B is a simplified diagram of an exemplary process for an initial categorization of voice prints into categories of a menagerie during enrollment in a biometric authentication system according to some embodiments.

In diagram 200a, signal 202 may correspond to training data for an AI model, such as an ML, NN or Deep NN (DNN) model, that utilizes an AI trainer and algorithm to classify voice prints during an authentication process shown in FIG. 2B. Signal 202 may be processed to determine a decision 204, such as categorizations 206 into different categories (e.g., animals) in a collection (e.g., menagerie) that adds additional information or context to the risk of another user impersonating a voice print. In this regard, signal 202 may correspond to voice prints that are initially provided as input data. The voice prints for signal 202 may be annotated or unannotated. With unannotated voice prints, the voice prints may be clustered or otherwise categorized according to similarity scores at decision 204 to achieve categorizations 206. Thereafter, feedback may be applied to retrain layers and provide more precise or desired categorizations. With annotated voice prints, initial categorizations of at least a portion of the voice prints into desired output classifications or similarities to other voice prints may be provided, which similarly may receive feedback to retrain layers of the AI model. An exemplary AI model's layers is shown in more detail in FIG. 3.

When proceeding from decision 204 to categorizations 206, an output layer, as well as one or more hidden layers next to the output layer (e.g., closest next layer that provides classifiers and/or mathematical relationships between data) may be removed. For example, a first hidden layer from the output layer (e.g., one layer removed), or a second hidden layer from the output layer (e.g., two layers removed) may be used in categorizing voice prints. This may not necessarily be performed during diagram 200a for training of the AI model, and instead be used during enrollment in FIG. 2B, but may also be considered and utilized when training the AI model, retraining the AI model, and/or providing feedback to adjust the weights and/or nodes of the AI model.

Categorizations 206 may be generated based on the trained AI model from decision 204. A menagerie may be used for categorizations 206, where voice prints are categorized by a corresponding "animal" in order to provide an encoding or other data that further describes the voice prints' likelihood of risk or impersonation, FRR, and/or ability to self-identify. For example, the menagerie may include sheep, goats, lambs, and wolves. Sheep self-identify well, are difficult to impersonate, and have a relatively low FRR. Goats have difficulty with their own voice print being identified and have a relatively high FRR, which tends to make replication by an imposter more difficult. Lambs are relatively easy to impersonate and therefore most at risk for fraud by imposters, because they are easier for other voice prints to match or overlap within a normal threshold score difference. Wolves more easily impersonate other voice prints, including their own, and therefore are also risky as both imposters/fraudsters and victims. Once categorizations are determined, the AI model may be deployed for use in FIG. 2B.

FIG. 2B is a simplified diagram of an exemplary process for an initial categorization of voice prints into categories of a menagerie during enrollment in a biometric authentication system according to some embodiments. Diagram 200b of FIG. 2B includes operations performed during use of an AI model for voice print categorization in an enrollment of a user with a biometric authentication system. For example, diagram 200b may be utilized by authentication application 132 discussed in reference to environment 100 of FIG. 1 during user enrollment in voice authentication. In this regard, diagram 200b displays a signal 208 for categorizing a voice print during enrollment into a menagerie or other collection of categories.

In diagram 200a, signal 208 is received during an enrollment request for voice authentication with a biometric authentication system. The biometric authentication system may be provided by a service provider for authentication through voice prints when accessing a voice system or other system capable of capturing voice samples of users. However, biometric authentication systems may also be provided via single devices and smaller systems of devices (e.g., a LAN of devices), which may similarly use the voice print categorization processes described herein. Signal 208 thus includes an enrollment request, a voice print 212, and/or an ID of the user requesting enrollment. Different IDs may be provided, such as GUIDs and/or UUIDs with the service provider, a phone number, name, device ID or fingerprint, or the like. Using voice print 212 from signal 208, the AI model performs a measurement 210 by taking voice print 212 as input at an input layer and performing a classification by predicting a categorization for voice print 212 into one of the categories for the menagerie or other collection of categories.

When processing voice print 212 to categorize voice print 212, the voice print classification system performing measurement 210 using the AI model may, instead of using an output layer for classification, examine one or more hidden layers of the AI model. The hidden layer(s) may be the trained layer that is one or two layers away from the output layer, for example. Measurement 210 may be determined by abstracting the decision-making of the AI model to one of the hidden layers nearby the output layer to obtain a better categorization of the input voice print into a categorization for the menagerie. For example, voice print 212 may be analyzed for self-identification rate or likelihood, FRR rate or likelihood, and/or impersonation rate or likelihood (including how well the voice sample impersonates others or is impersonated). This may be determined based on similarity scores and other mathematical observations of voice print 212 as compared to other voice prints and therefore the categorization or cluster for voice print 212. Thus, with the menagerie previous discussed, a category 214 may correspond to sheep, goat, lamb, or wolf for voice print 212 in the menagerie categorization described herein. Once categorized, voice print 212 is encoded with category 214 corresponding to sheep, goat, lamb, or wolf when utilizing the menagerie example, however, other categorizations may be used. After encoding voice print 212 with category 214, voice print 212 may be compressed and stored, which allows category 214 to be stored and associated with voice print 212, as well as compression of voice print 212 to reduce storage space requirement and efficiently conserve computing resources.

Figure 2C:
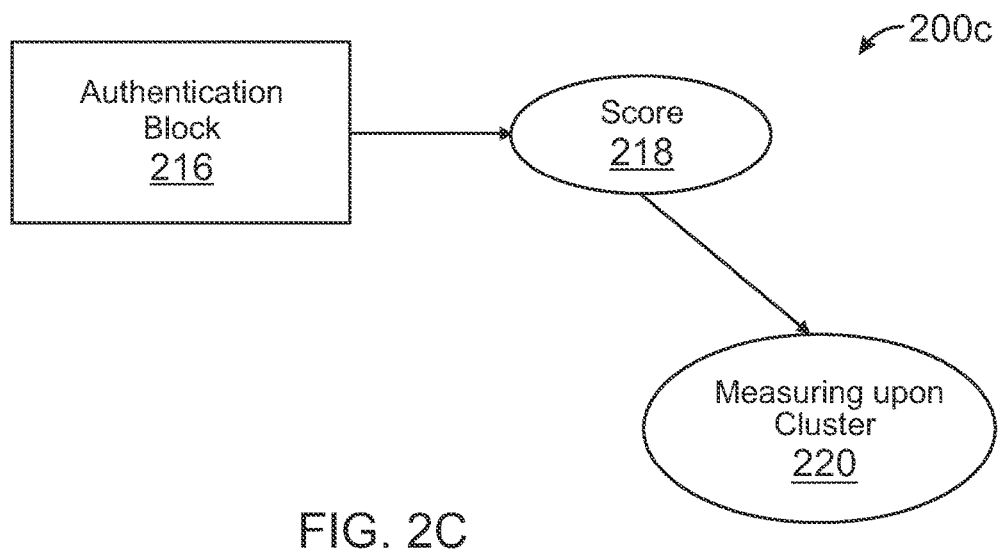
FIG. 2C is a simplified diagram of an exemplary process for authenticating a voice print in a biometric authentication system using classifications in a menagerie according to some embodiments.

FIG. 2C is a simplified diagram of an exemplary process for authenticating a voice print in a biometric authentication system using classifications in a menagerie according to some embodiments. Diagram 200c of FIG. 2C includes operations performed during authentication of a user via voice authentication with a biometric authentication system. For example, diagram 200c may be utilized by authentication application 132 discussed in reference to environment 100 of FIG. 1 during voice authentication. In this regard, diagram 200c displays an authentication block 216 for authenticating a user via a voice print.

During authentication block 216, a voice sample or print may be received during an authentication attempt. The authentication attempt may include an ID of a user that is attempting a login or authentication with a service provider or other biometric authentication system that includes voice authentication. The authentication attempt further includes the required voice print of the user attempting the authentication. Authentication block 216 may include accessing the stored, compressed, and/or encoded voice print associated with the ID, which includes the compressed voice print and data, as well as the encoding into a categorization. For example, when using a menagerie, the voice print may be encoded with one of the four categories belonging to sheep, goat, lamb, or wolf. A score 218 is output based on a comparison of the received voice print to the stored voice print. The comparison may correspond to a similarity score or assessment of patterns, templates, features, and the like in each voice print, which are compared for likelihood of a match.

Using score 218, an authentication may be performed using a measuring upon cluster operation 220. For example, a threshold similarity score or other comparison measurement may normally be required to perform authentication. However, with more or less risky voice prints (i.e., the likelihood of impersonation), the threshold may be dynamically adjusted. For example, when encoded with a wolf or lamb encoding in the exemplary menagerie of voice samples, the dynamic threshold score may be increased so that measuring upon cluster operation 220 requires a higher assurance of similarity between the voice samples. Conversely, with sheep or goats, measuring upon cluster operation 220 may lower the dynamic threshold score so that authentication may be performed faster and/or with a lower FRR. However, in order to minimize risk or otherwise meet compliance standards, the threshold may not be lowered much or at all, even with sheep or goats. Once authentication based on score 218 and measuring upon cluster operation 220 is conducted, an authentication result may be completed and output to the user.

Figure 3:
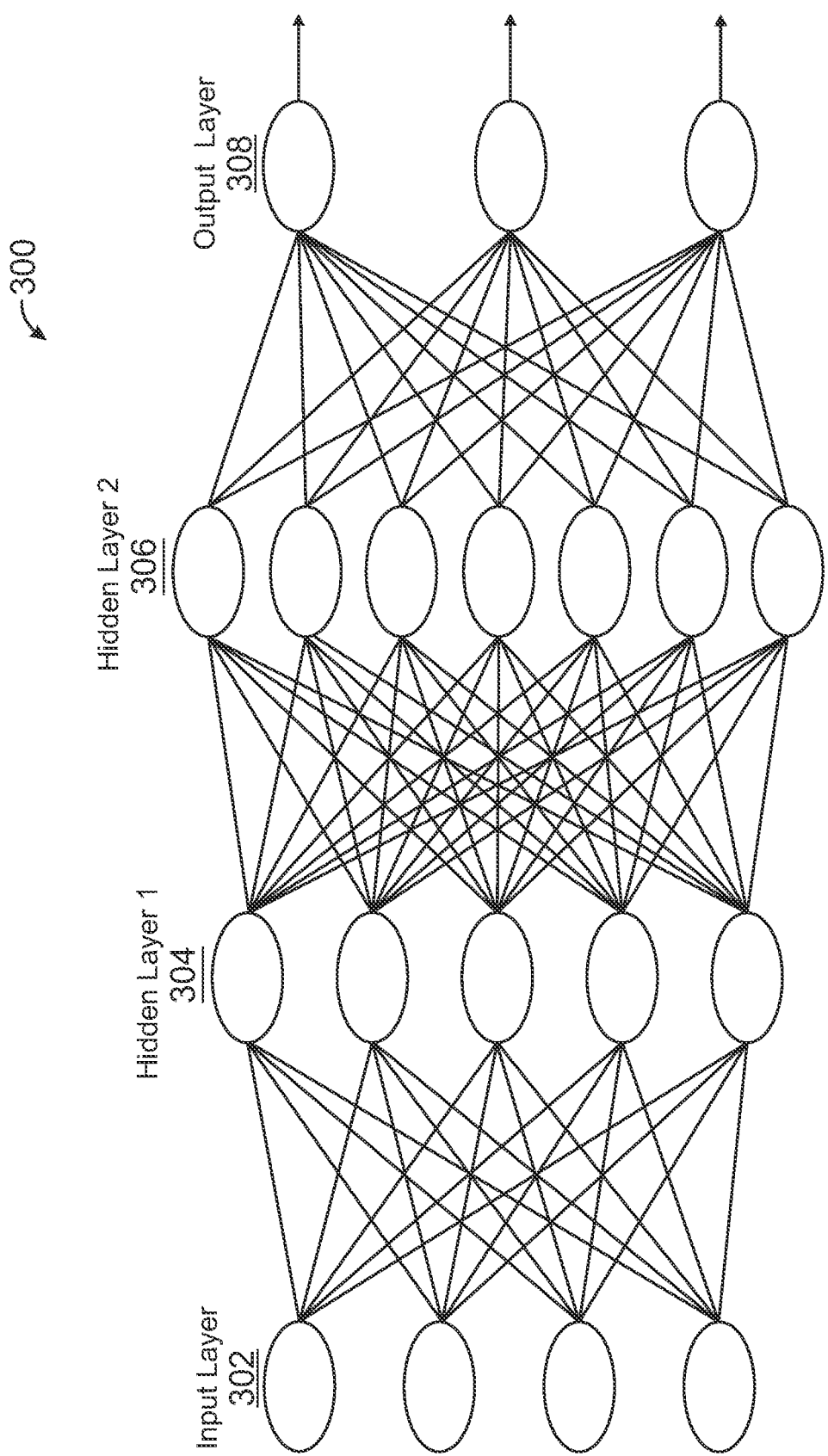
FIG. 3 is a simplified diagram of different layers of an AI model trained for categorizations of voice prints for biometric authentication according to some embodiments.

FIG. 3 is a simplified diagram of different layers of an AI model trained for categorizations of voice prints for biometric authentication according to some embodiments. FIG. 3 includes a neural network 300, such as a trained DNN for categorization of voice prints according to a menagerie of categories. As shown, neural network 300 includes three groupings of layers—an input layer 302, hidden layers shown as hidden layer 1 304 and hidden layer 2 306, and an output layer 308 having one or more nodes, however, different layers may also be utilized. For example, although two layers are shown in the hidden layers depicted, neural network 300 may include fewer, or as many, hidden layers as necessary or appropriate.

These nodes are connected to nodes in an adjacent layer. In this example, neural network 300 receives a set of input values and produces one or more output values, for example, in the case of voice print categorization to determine a particular category in a menagerie for a voice print provided as input. The outputs may correspond to a score and/or output classification. However, different, more, or fewer outputs may also be provided based on the training. Furthermore, an output may also be considered a hidden layer during categorizations for a menagerie of categories, such as hidden layer 1 304 and/or hidden layer 2 306. When neural network 300 is used, each node in the input layer may correspond to a distinct attribute or input data type derived from the training data provided by service provider server 120. In a non-limiting example, the input nodes may include voice prints 124, which may or may not include annotations corresponding to voice categorizations 126.

In some embodiments, each of the nodes in the hidden layer generates a representation, which may include a mathematical computation (or algorithm) that produces a value based on the input values of the input nodes. The mathematical computation may include assigning different weights to each of the data values received from the input nodes. The hidden layer nodes may include different algorithms and/or different weights assigned to the input data and may therefore produce a different value based on the input values. The hidden layers depicted include two hidden layers, hidden layer 1 304 and hidden layer 2 306. Each node in a hidden layer may be connected to the nodes in the adjacent hidden layer such that nodes from input layer 302 may be connected to nodes in hidden layer 1 304, nodes in hidden layer 1 304 may be connected to nodes in hidden layer 2 306, and nodes in hidden layer 2 306 may be connected to nodes and corresponding outputs in output layer 308. The values generated by the hidden layer nodes may be used by the output layer node to produce an output value for neural network 300. When neural network 300 is used to categorize voice prints, the output values produced by neural network 300 may indicate a likelihood that a voice print falls into a particular category of a menagerie, such as a sheep, goat, lamp, or wolf category. This category therefore further describes the voice print and data about the voice print, such as self-identification rate or likelihood, FRR rate or likelihood, and impersonation rate or likelihood. Thus, the outputs in output layer 308 (or a previous hidden layer when used) may be used as encoding to voice prints.

Neural network 300 may be trained by using training data, which may also be prepared by converting data to numerical representations and vectors. By providing training data to neural network 300, the nodes in exemplary hidden layer 1 304 and hidden layer 2 306 may be trained (adjusted) such that an optimal output (e.g., a classification) is produced in the output layer based on the training data. By continuously providing different sets of training data and penalizing neural network 300 when the output of neural network 300 is incorrect (e.g., when the voice prints are improperly categorized and/or lead to fraud or impersonation), neural network 300 (and specifically, the representations of the nodes in the hidden layer) may be trained (adjusted) to improve its performance in data classification. Adjusting neural network 300 may include adjusting the weights associated with each node in the hidden layer.

Figure 4:
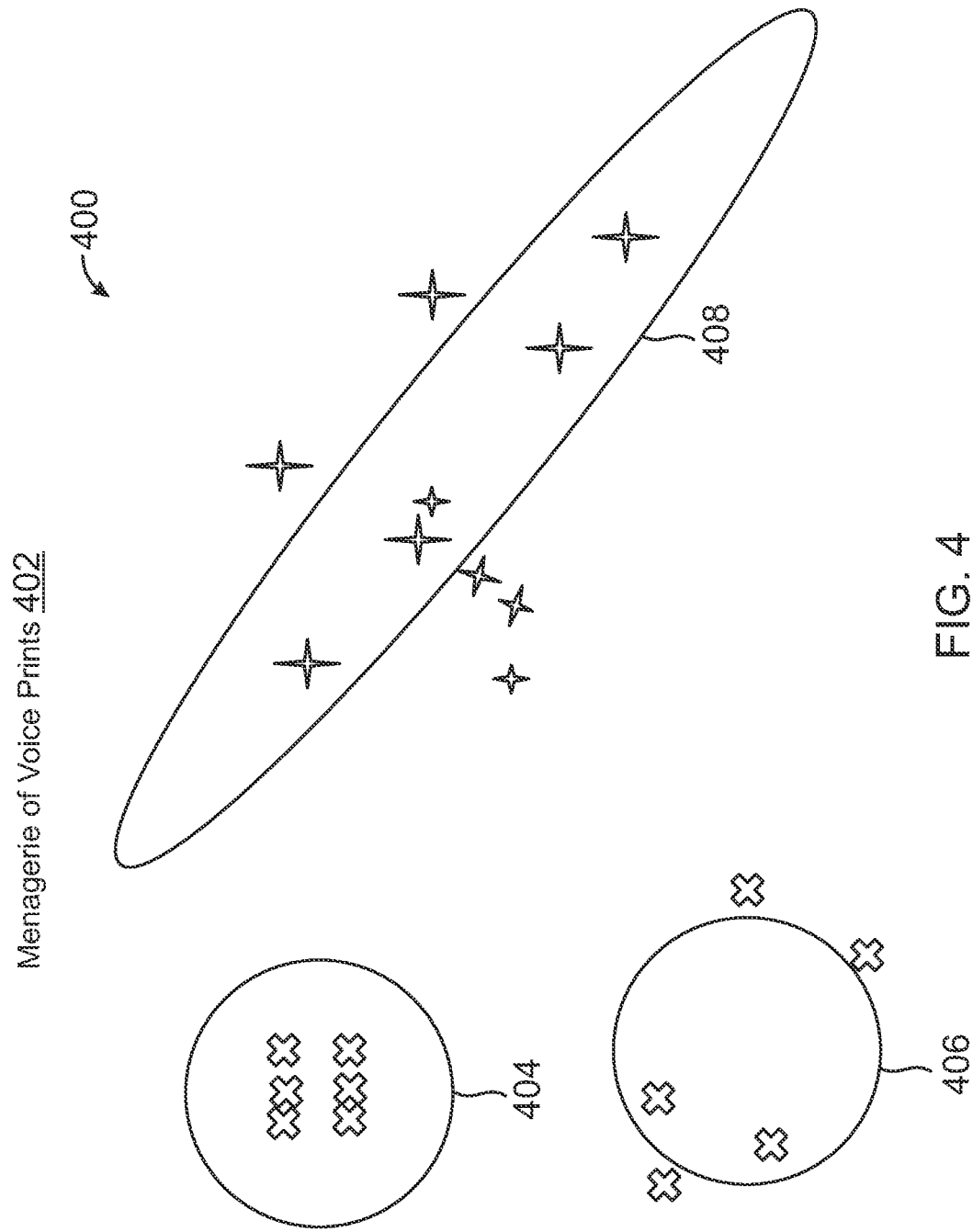
FIG. 4 is a simplified diagram of an exemplary categorization of different types of voice prints according to some embodiments.

FIG. 4 is a simplified diagram of an exemplary categorization of different types of voice prints according to some embodiments. Diagram 400 includes a visualization of clustering and/or categorizing voice prints into a menagerie or other collection of categories. In this regard, diagram 400 displays a menagerie of voice prints 402 that may include categorizations of voice prints for encoded data with compressed voice prints, which allows for dynamic adjustment of threshold comparison or similarity scores. This therefore provides faster and/or lower latency voice authentication, while obtaining the data storage reduction and data processing savings provided through data compression.

Menagerie of voice prints 402 in diagram 400 shows clustering or categorizing voice prints by the features when utilizing an AI model trained for voice print categorization. Conventionally, voice authentication assumes that every single person always demonstrates similarity between their voice prints, where similarity assumes that for a given known mathematical metric (traditionally $R^2$), two voice prints of the same user will statistically provide lower distance than each of the two voice prints compared with other users' voice prints. Thus, the traditional assumption is that every user has a span of voice prints and the span is contained in a ball or other representation in a voice print space, which has the same diameter or internal area. Further, conventionally, the balls are scattered in the voice print space in a homogenous fashion and are symmetric around the origin of the voice print space. Thus, during training a diameter of a single user's ball is known and related to the single user's variance as compared to other balls.

However, voice print data in menagerie of voice prints 402 demonstrates that the conventional representation does not adequately consider that some voice prints better self-identify and are harder to impersonate, while others are more vulnerable and likely to be impersonated, or both. Thus, the equivariance approach to matching and authenticating voice prints may be wrong, and some users may be better or worse at impersonation and self-identification in real trials and use cases. As such, a collection of different categories, such as menagerie of voice prints 402 may better represent voice print similarities based on self-identification and/or impersonation. For example, sheep 404 are shown in menagerie of voice prints 402, where sheep 404 are those voice prints for a user that are more tightly clustered as they self-identify well and are more difficult to replicate or impersonate. Sheep 404 have relatively low FRR, as their corresponding voice prints have a significant number of patterns or features within a template voice print for matching, and therefore are more difficult for a malicious party to impersonate. The voice prints for the user shown in sheep 404 are therefore far from other voice prints and are more tightly clustered.

Goats 406 may also be relatively difficult to impersonate but also have a relatively high FRR rate. Goats 406 may have certain features or patterns that are difficult to replicate, even by their own users when later submitted in a voice authentication request. The voice prints for a user scattered around goats 406 may also have relatively low similarity scores with others but may also have lower similarity scores with their own voice prints. Thus, goats 406 lead to higher rates of authentication refusal but also difficulty in impersonating.

In contrast, lambs and wolves 408 have voice prints that are relatively easily confused based on similarity scores alone. Lambs are also more easily impersonated based on the patterns and other features in their template voice print, while wolves more easily impersonate others including themselves. In menagerie of voice prints 402, there are a significant overlap of voice prints for a user in lambs and wolves 408. As such, those falling into these categories have significantly more risk during authentication. By utilizing this information of categorizations for different voice prints, a voice print at enrollment may be encoded with a categorization and compressed so that initial information is known about the voice print, and authentication requirements may be adjusted. Using menagerie of voice prints 402 and the corresponding categorizations, the dimension of a voice print may be reduced through compression while still retaining substantially similar or increased accuracy in performing voice authentication (e.g., through the classification, which provides additional information about the two voice prints that are being compared).

Figure 5:
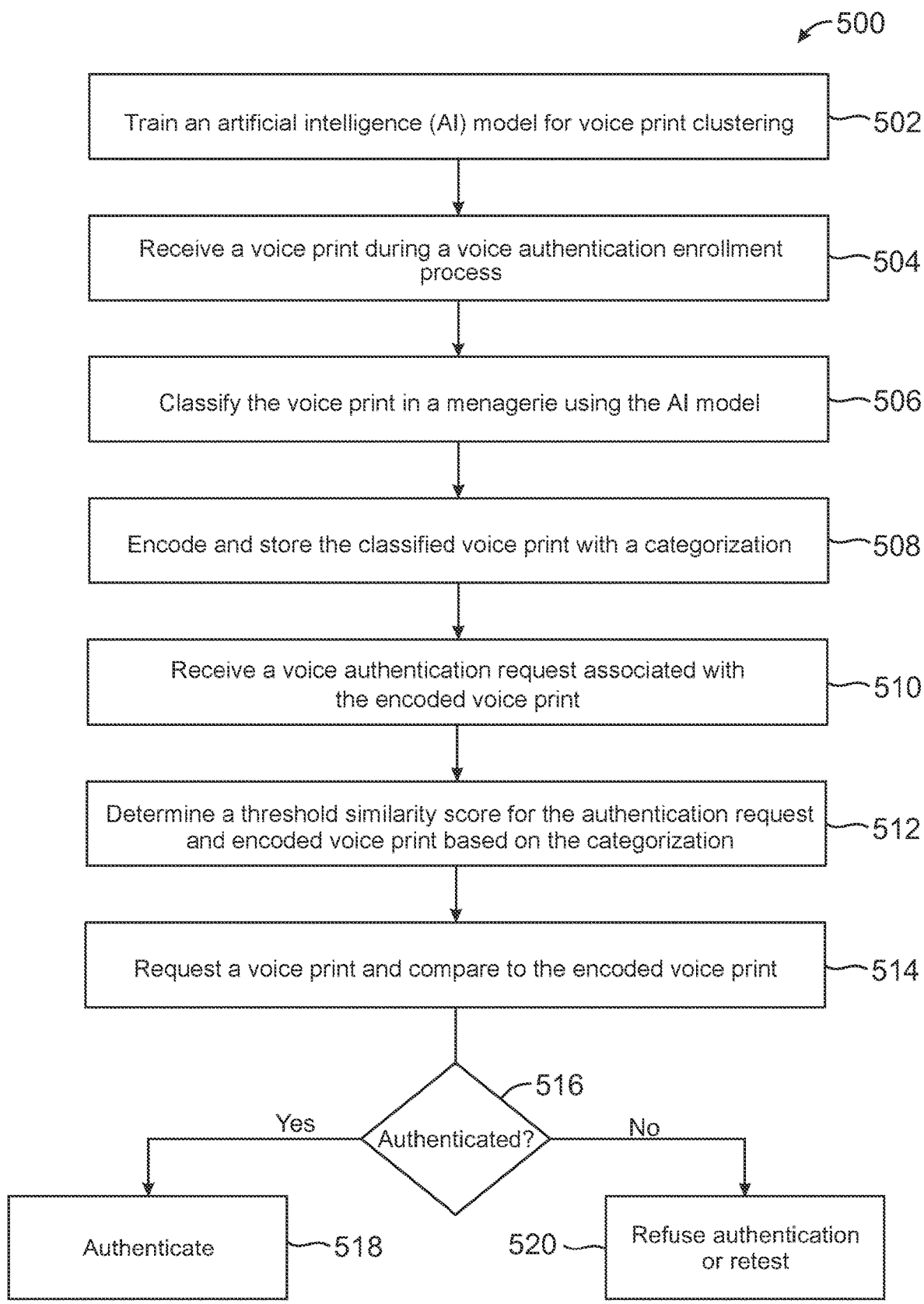
FIG. 5 is an exemplary flowchart for biometric authentication through voice print categorization using AI according to some embodiments.

FIG. 5 is an exemplary flowchart for biometric authentication through voice print categorization using AI according to some embodiments. In some embodiments, generation and utilization of an AI model trained for voice print categorization described in method 500 of FIG. 5 can be implemented and performed using an online service provider system, such as service provider server 120. One or more of the processes 502-520 of method 500 may be implemented, at least in part, in the form of executable code stored on non-transitory, tangible, machine-readable media that when run by one or more processors may cause the one or more processors to perform one or more of the processes 502-520. In some embodiments, method 500 can be performed by one or more computing devices in environment 100 of FIG. 1.

At step 502 of method 500, an AI model for voice print clustering is trained. This may be performed as discussed in FIGS. 2A and 3 by utilizing an ML, NN, or DNN trainer and algorithm with training data of sample voice prints to train the layers of the corresponding model for a predictive output, such as a classification into a categorization for an input voice print. This may include training an AI model to score and/or cluster voice samples according to their similarities and/or categorizations.

At step 504, a voice print is received during a voice authentication enrollment process. The voice print may be received from a user that is requesting enrollment in a process for voice authentication, and may therefore further be received with an ID, login, phone number, username, or the like for the user. At step 506, the voice print is classified in a menagerie using the AI model. The menagerie may correspond to a collection of categories for voice prints. In a menagerie embodiment, the different categorizations of voice prints may be identified using animals, such as sheep, goats, lambs, and wolves, as discussed herein. Each classification may provide corresponding information on how well the voice prints cluster or are similar when being received during enrollment and authentication, such as tightly clustered voice prints that self-identify well or loosely clustered voice prints that impersonate or are impersonated well.

At step 508, the classified voice print is then encoded and stored with its corresponding categorization. For example, for the classified voice print, a categorization identifier, data string, or the like may be used to encode the voice print. This provides additional information about the voice print, and therefore allows for compression when storing. Certain compression may cause data loss, while lossless data compression may be more easily stored and later used with the encoding from the categorization. Thereafter, the user is enrolled for voice authentication using the encoded and compressed voice print.

At step 510, a voice authentication request associated with the encoded voice print is received. The voice authentication request may include an identifier or other identification information that allows for retrieval of the encoded voice print needed for voice authentication. Thus, the encoded and compressed voice print is retrieved from storage and used to compare to a received voice print for the voice authentication request. At step 512, a threshold similarity score for the authentication request and encoded voice print is determined based on the categorization. In this regard, a threshold may be dynamically adjusted for different voice prints and their categorizations, such as by requiring a higher or lower similarity score between the stored voice print during enrollment and a received voice print for the user.

At step 514, a voice print is requested and compared to the encoded voice print. The voice print may be received after the voice authentication request and in response to a request to input a voice print, or instead may be received during the voice authentication request. The voice print may then be compared to the encoded voice print based on the required similarity score and/or threshold for authentication. Based on the comparison of the voice prints and the required similarity between the voice prints, at step 516, it is determined whether the voice print received for the user authenticates the user using the encoded voice print and the dynamic threshold or similarity score requirement.

If authentication occurs by the voice prints matching to a sufficient similarity, at step 518, authentication of the voice authentication request is approved and the user or device requesting the voice authentication is approved. This may provide access to one or more systems, computing resources, data, accounts, or the like. However, if authentication at step 516 does not occur and the voice prints do not match to a sufficient similarity, then method 500 proceeds instead to step 520, where authentication is refused, or the user is retested for voice authentication. Retesting may request input of a new voice pattern from the user for further comparison to the encoded voice print.

As discussed above and further emphasized here, FIGS. 1, 2A-C, 3, 4, and 5 are merely examples of service provider server 120 and corresponding methods for categorizing voice prints for encoding, compression, and voice authentication, which examples should not be used to unduly limit the scope of the claims. One of ordinary skill in the art would recognize many variations, alternatives, and modifications.

Figure 6:
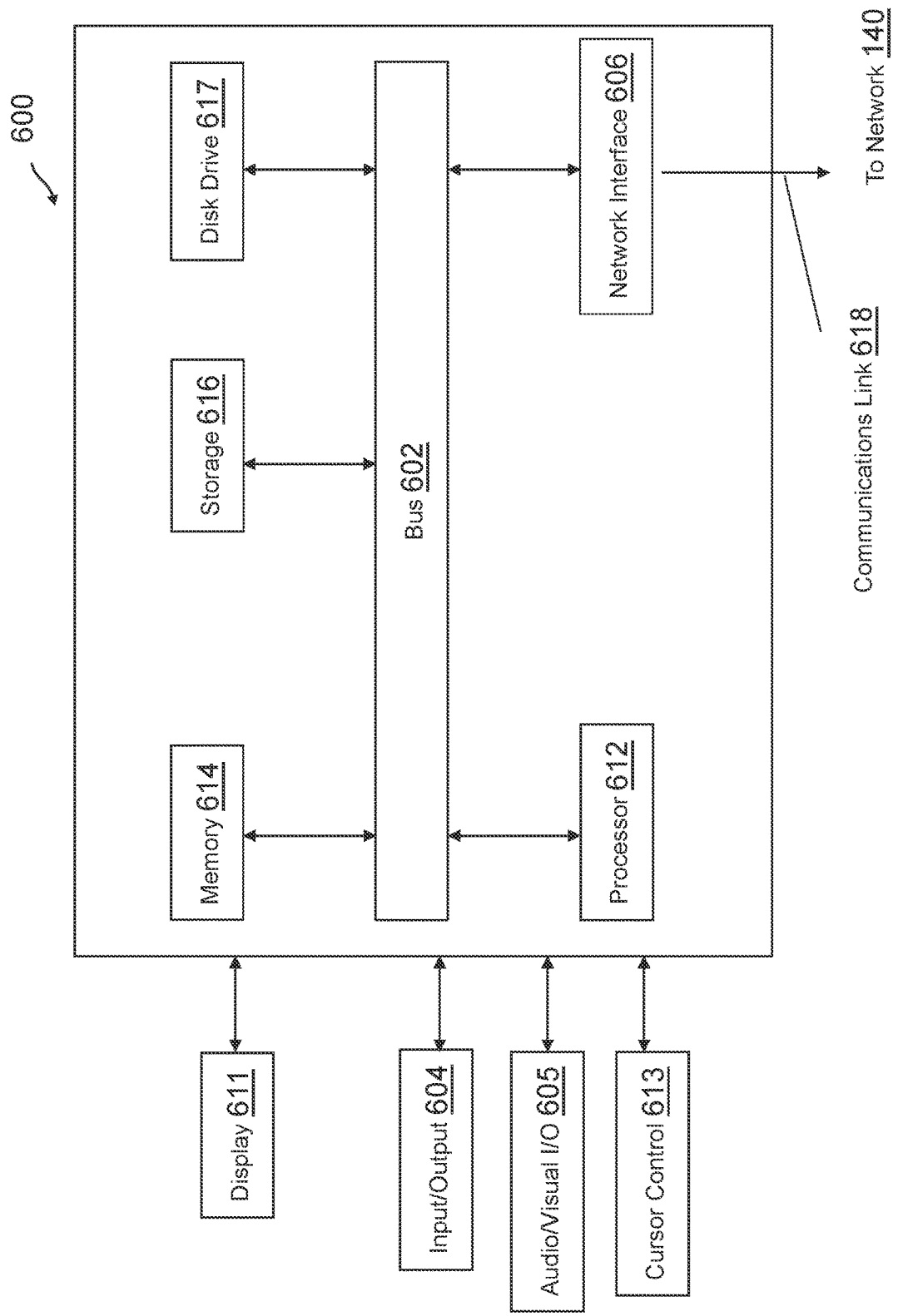
FIG. 6 is a simplified diagram of a computing device according to some embodiments.

FIG. 6 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio/visual input/output component 605 may also be included to allow a user to use voice for inputting information by converting audio signals. Audio/visual I/O component 605 may allow the user to hear audio, and well as input and/or output video. A transceiver or network interface 606 transmits and receives signals between computer system 600 and other devices, such as another communication device, service device, or a service provider server via network 140. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A biometric authentication system configured to categorize voice prints during a voice authentication, the biometric authentication system comprising:

a processor and a computer readable medium operably coupled thereto, the computer readable medium comprising a plurality of instructions stored in association therewith that are accessible to, and executable by, the processor, to perform voice authentication operations which comprise:

receiving an enrollment of a user in the biometric authentication system;

requesting a first voice print comprising a sample of a voice of the user;

receiving the first voice print of the user during the enrollment;

accessing a plurality of categorizations of the voice prints for the voice authentication, wherein each of the plurality of categorizations comprises a portion of the voice prints based on a plurality of similarity scores of distinct voice prints in the portion to a plurality of other voice prints;

processing the first voice print using a neural network comprising an input layer for features from the voice print, a plurality of hidden layers, and an output layer for a classification of the first voice print;

determining, using a hidden layer of the plurality of hidden layers of the neural network, an embedding of the features for the first voice print, wherein the embedding determined using the hidden layer is separate from the classification provided by the output layer;

calculating a first similarity score between the embedding of the features for the first voice print and a plurality of embeddings of the voice prints for other users, wherein the first similarity score is unique for the user and distinct from instances of similarity scores between each of the plurality of embeddings for each of the voice prints;

determining one of the plurality of categorizations of the voice prints for the first voice print based on the first similarity score; and encoding the first voice print with a value identifying the one of the plurality of categorizations for the embedding.

2. The biometric authentication system of claim 1, wherein the voice authentication operations further comprise:

receiving a voice authentication request of the user;

determining, based on the voice authentication request, the first voice print and the one of the plurality of categorizations for the first voice print; and dynamically adjusting a threshold similarity score for the voice authentication of the user based on the one of the plurality of categorizations.

3. The biometric authentication system of claim 2, wherein the voice authentication operations further comprise:

in response to the voice authentication request and the dynamically adjusted threshold similarity score, requesting a second voice print for the voice authentication;

determining, using the neural network, a second similarity score between the first voice print and the second voice print; and authenticating the voice authentication request based on the second similarity score and the dynamically adjusted threshold similarity score.

4. The biometric authentication system of claim 1, wherein the plurality of hidden layers are trained for similarity score determinations between the voice prints, and wherein the hidden layer comprises one of a first hidden layer that is one layer from the output layer or a second hidden layer that is two layers from the output layer.

5. The biometric authentication system of claim 1, wherein the plurality of categorizations comprise four categorizations, wherein a first categorization of the four categorizations comprises a first portion of the voice prints that are most rarely matched with the plurality of other voice prints, and wherein a second categorization comprises a second portion of the voice prints that are mostly likely matched with a third portion of the voice prints for a third categorization.

6. The biometric authentication system of claim 5, wherein the second categorization and the third categorization require a heightened level of a threshold similarity score during the voice authentication over a base level of the threshold similarity score.

7. The biometric authentication system of claim 1, wherein the encoding occurs prior to completing the enrollment of the user for the voice authentication using the first voice print, and wherein the voice authentication operations further comprise:

compressing the encoded first voice print using a first data compression;

storing the compressed and encoded first voice print; and enrolling the user for the voice authentication using the first voice print.

8. The biometric authentication system of claim 7, wherein the first data compression of the encoded first voice print is selected to have a higher compression and lower data size than a second data compression of the first voice print alone.

9. A method to categorize voice prints during voice authentication for a biometric authentication system, which method comprises:

receiving an enrollment of a user in the biometric authentication system;

requesting a first voice print comprising a sample of a voice of the user;

receiving the first voice print of the user during the enrollment;

accessing a plurality of categorizations of the voice prints for the voice authentication, wherein each of the plurality of categorizations comprises a portion of the voice prints based on a plurality of similarity scores of distinct voice prints in the portion to a plurality of other voice prints;

processing the first voice print using a neural network comprising an input layer for features from the voice print, a plurality of hidden layers, and an output layer for a classification of the first voice print;

determining, using a hidden layer of the plurality of hidden layers of the neural network, an embedding of the features for the first voice print, wherein the embedding determined using the hidden layer is separate from the classification provided by the output layer;

calculating a first similarity score between the embedding of the features for the first voice print and a plurality of embeddings of the voice prints for other users, wherein the first similarity score is unique for the user and distinct from instances of similarity scores between each of the plurality of embeddings for each of the voice prints;

determining one of the plurality of categorizations of the voice prints for the first voice print based on the first similarity score; and encoding the first voice print with a value identifying the one of the plurality of categorizations for the embedding.

10. The method of claim 9, which further comprises:

receiving a voice authentication request of the user;

determining, based on the voice authentication request, the first voice print and the one of the plurality of categorizations for the first voice print; and dynamically adjusting a threshold similarity score for the voice authentication of the user based on the one of the plurality of categorizations.

11. The method of claim 10, which further comprises:

in response to the voice authentication request and the dynamically adjusted threshold similarity score, requesting a second voice print for the voice authentication;

determining, using the neural network, a second similarity score between the first voice print and the second voice print; and authenticating the voice authentication request based on the second similarity score and the dynamically adjusted threshold similarity score.

12. The method of claim 9, wherein the plurality of hidden layers are trained for similarity score determinations between the voice prints, and wherein the hidden layer comprises one of a first hidden layer that is one layer from the output layer or a second hidden layer that is two layers from the output layer.

13. The method of claim 9, wherein the plurality of categorizations comprise four categorizations, wherein a first categorization of the four categorizations comprises a first portion of the voice prints that are most rarely matched with the plurality of other voice prints, and wherein a second categorization comprises a second portion of the voice prints that are mostly likely matched with a third portion of the voice prints for a third categorization.

14. The method of claim 13, wherein the second categorization and the third categorization require a heightened level of a threshold similarity score during the voice authentication over a base level of the threshold similarity score.

15. The method of claim 9, wherein the encoding occurs prior to completing the enrollment of the user for the voice authentication using the first voice print, and wherein the method further comprises:

compressing the encoded first voice print using a first data compression;

storing the compressed and encoded first voice print; and enrolling the user for the voice authentication using the first voice print.

16. The method of claim 15, wherein the first data compression of the encoded first voice print is selected to have a higher compression and lower data size than a second data compression of the first voice print alone.

17. A non-transitory computer-readable medium having stored thereon computer-readable instructions executable to categorize voice prints during voice authentication for a biometric authentication system, the computer-readable instructions executable to perform voice authentication operations which comprise:

receiving an enrollment of a user in the biometric authentication system;

requesting a first voice print comprising a sample of a voice of the user;

receiving the first voice print of the user during the enrollment;

accessing a plurality of categorizations of the voice prints for the voice authentication, wherein each of the plurality of categorizations comprises a portion of the voice prints based on a plurality of similarity scores of distinct voice prints in the portion to a plurality of other voice prints;

processing the first voice print using a neural network comprising an input layer for features from the voice print, a plurality of hidden layers, and an output layer for a classification of the first voice print;

determining, using a hidden layer of the plurality of hidden layers of the neural network, an embedding of the features for the first voice print, wherein the embedding determined using the hidden layer is separate from the classification provided by the output layer;

calculating a first similarity score between the embedding of the features for the first voice print and a plurality of embeddings of the voice prints for other users, wherein the first similarity score is unique for the user and distinct from instances of similarity scores between each of the plurality of embeddings for each of the voice prints;

determining one of the plurality of categorizations of the voice prints for the first voice print based on the first similarity score; and encoding the first voice print with a value identifying the one of the plurality of categorizations for the embedding.

18. The non-transitory computer-readable medium of claim 17, wherein the voice authentication operations further comprise:

receiving a voice authentication request of the user;

determining, based on the voice authentication request, the first voice print and the one of the plurality of categorizations for the first voice print; and dynamically adjusting a threshold similarity score for the voice authentication of the user based on the one of the plurality of categorizations.

19. The non-transitory computer-readable medium of claim 18, wherein the voice authentication operations further comprise:

in response to the voice authentication request and the dynamically adjusted threshold similarity score, requesting a second voice print for the voice authentication;

determining, using the neural network, a second similarity score between the first voice print and the second voice print; and authenticating the voice authentication request based on the second similarity score and the dynamically adjusted threshold similarity score.

20. The non-transitory computer-readable medium of claim 17, wherein the plurality of hidden layers are trained for similarity score determinations between the voice prints, and wherein the hidden layer comprises one of a first hidden layer that is one layer from the output layer or a second hidden layer that is two layers from the output layer.

* * * * *